Aug. 15, 1939. H. SCHARLAU 2,169,742
RECEIVING APPARATUS FOR DIRECTION FINDING
Filed Jan. 25, 1936 2 Sheets-Sheet 1
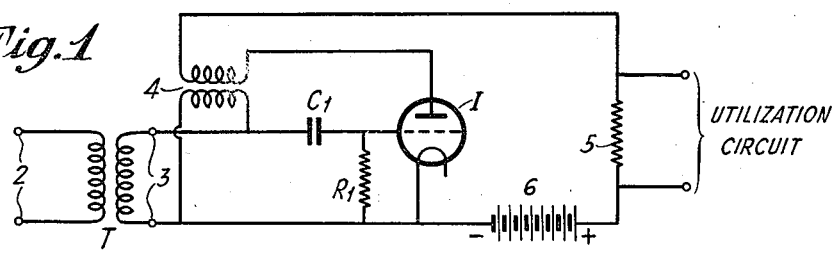
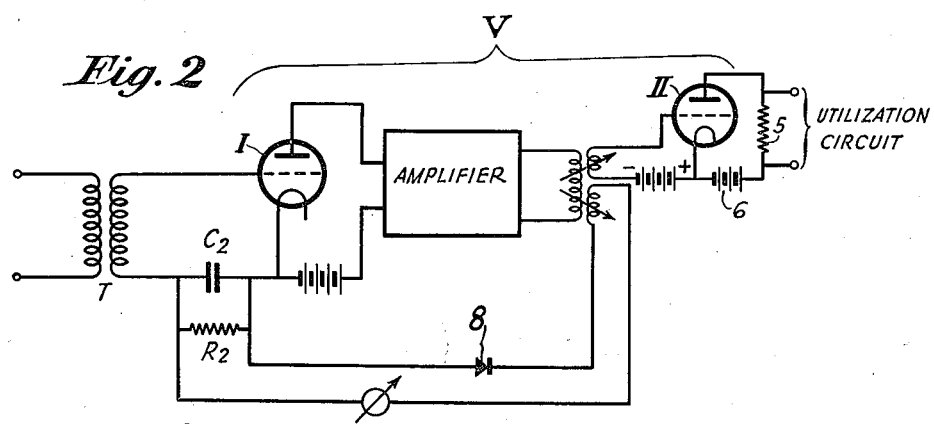
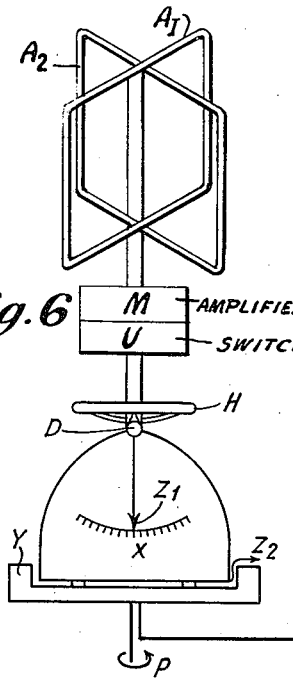
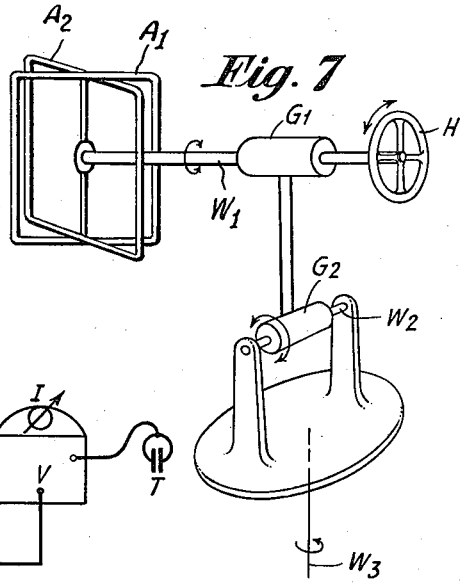
INVENTOR.
HANS SCHARLAU
BY *H. G. Grover*
ATTORNEY.

Aug. 15, 1939    H. SCHARLAU    2,169,742
RECEIVING APPARATUS FOR DIRECTION FINDING
Filed Jan. 25, 1936    2 Sheets-Sheet 2
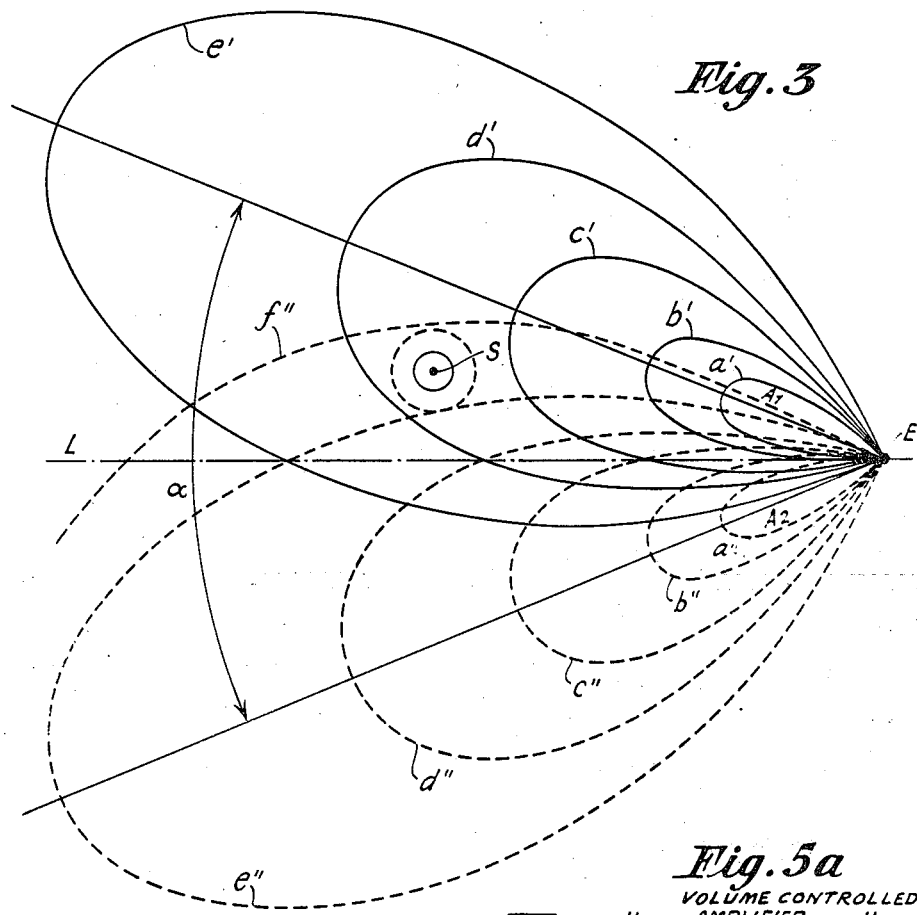
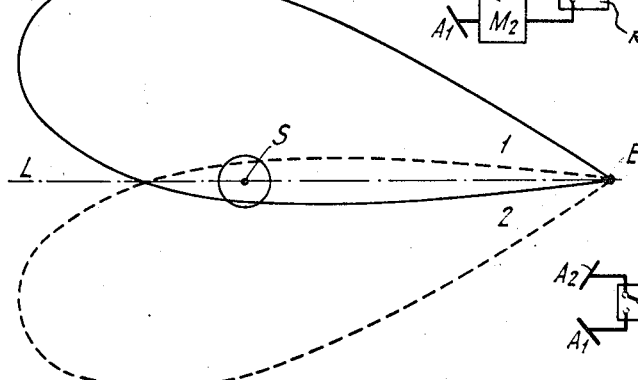
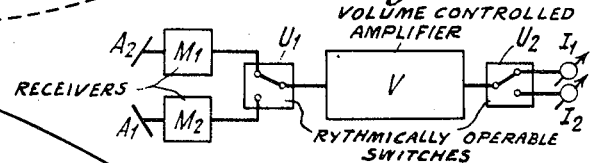
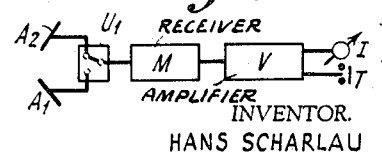
INVENTOR.
HANS SCHARLAU
BY
ATTORNEY.

Patented Aug. 15, 1939

2,169,742

UNITED STATES PATENT OFFICE 2,169,742

RECEIVING APPARATUS FOR DIRECTION FINDING

Hans Scharlau, Berlin, Germany, assignor to Telefunken Gesellschaft für Drahtlose Telegraphie m. b. H., Berlin, Germany, a corporation of Germany Application January 25, 1936, Serial No. 60,767
In Germany January 17, 1935

4 Claims. (Cl. 250—11)

The present invention is concerned with a receiving method adapted to insure safe and precise determination of the position of a single-beam transmitter or a rotary-beam transmitter. The device is especially adapted for the guiding or piloting of craft or for locating transmitters.

Methods are known in the prior art for determining the position of a long-wave directional or rotary beacon in which recourse is had to loop or frame aerials. With these latter it is possible to determine direction either by the aid of the maximum or the minimum signal strength method. Maximum volume direction finders involve the shortcoming that the receiving antenna must be turned through considerable angles about the main direction of maximum signal intensity in order to obtain an appreciable change in the indications. This is due to the fact that in the neighborhood of maximum volume the differential quotient of signal strength in respect to angles is small. In fact, an accurate determination of the direction of a straight line between receiver and transmitter or beacon is practically impossible when using the maximum signal method.

Minimum signal direction finders have the shortcoming that the theoretically sharp minimum volume is not always obtainable under practical conditions. In fact, the distant transmitter will still be heard even when the antenna loop is oriented exactly at right angles to the line of direction between the receiver and transmitter. The cause may be sought, on the one hand, in the capacity between the turns of the loop in reference to ground or surrounding objects, and, on the other hand, in neighboring conductors which distort the radiation field. Moreover, frame or loop direction finders will give accurate indications only if the existing elevation angle to the beacon is known.

For direction finding with short wave single-beams or rotary-beams, for practical reasons, the use of loops is not feasible. In fact, it is necessary to use other directional receiver arrangements for insuring sharp concentration of the incoming energy.

Directional receiving arrangements insuring a concentration as sharp as here required are difficult to build. Furthermore, the location of a transmitter becomes increasingly more difficult the more sharply concentrated is the receiving characteristic. In such cases the directional indication is apt to be lost when making very slight changes in the orientation of the antenna.

Still, there are a number of problems which may be solved only with a receiving method or a receiver arrangement which is of a kind to allow an exact determination of the line of direction between the transmitter and the receiver.

Now the receiving method of the present invention is adapted to ascertain the exact position of a receiver relative to a single-beam or a rotary-beam beacon. This method has the characteristic feature that at the receiving end two directional antennae are mounted in fixed angular relation to each other. The incoming voltages furnished thereby, and optionally amplified separately, are by way of a change-over switch alternately impressed upon an amplifier whose output is connected to the receiving indicator. I also employ a gain control device which serves to accentuate the difference between the stronger and the weaker of two signals.

The gain-controlled amplifier could consist of arrangements of the kind known and suggested in the prior art.

Amplifier devices designed to increase the amplitude ratios of two or more signals have been suggested in a co-pending U. S. application, Serial No. 31,814, filed July 17, 1935. These devices operate in such manner that the threshold value of the receiver outfit is brought under control of variations in the amplitude of the signaling energy prevailing at a given instant. The threshold value normally lies just below the maximum amplitude. For shifting the threshold value, recourse is had to circuit elements whose time constant is high in contrast to the duration of the signal.

My invention will now be described in further detail, reference being had to the accompanying drawings in which:

Figure 1 shows diagrammatically a type of receiving circuit which lends itself to the carrying out of my invention;

Fig. 2 shows an embodiment of my invention including certain improvements and variations with respect to the circuit of Fig. 1;

Figs. 3 and 4 are diagrams of directed radio wave envelopes, these diagrams being useful in explaining the theory of operation of my invention;

Figs. 5a and 5b are block diagrams of different embodiments; and

Figs. 6 and 7 show certain constructional features of the invention.

Referring to Fig. 1 a transformer T is shown with input terminals 2 for its primary, and output terminals 3 for its secondary. Signals of any desired frequency may be impressed across the terminals 2. They are then fed through the transformer to an input circuit for an electron discharge tube I. This input circuit is connected to the terminals 3 and includes a condenser-resistance combination $C_1 R_1$. The time constant of this combination, as above suggested, is so chosen that the working point of the tube I in dependence upon the signal of maximum amplitude will be always so placed that the smaller signals will appear in the plate circuit far less amplified than the signal exhibiting the highest absolute amplitude. In order to increase or enhance this result, feedback by way of a transformer 4 is established preferably between the plate and the grid circuit of tube I. The increased amplitude of the originally stronger signal is again used to build up or to widen the amplitude ratio. The anode-cathode circuit of the tube I includes a source of direct current potential 6 and, if desired, an impedance 5. A utilization circuit of any preferred type may be connected across the impedance 5.

Amplifier arrangements have been suggested in the earlier art for emphasizing the magnitude ratio or proportions of two signals. These devices operate in such a way that the incoming signals are fed to an amplifier designed for automatic adjustment to a constant level, and that the time constant of amplification or gain control is of an order of magnitude equal to the briefest signal.

Fig. 2 shows certain details of a circuit arrangement found to be useful in carrying out my invention. This figure may be considered as comprehended within the scope of either of the diagrams of Fig. 5a and Fig. 5b, these last mentioned figures representing alternative embodiments. The description immediately following makes reference, therefore, to all three figures.

The object of the arrangement is to increase the gain of the amplifier V in response to the weaker of two input signals but to render such gain increase effective upon the stronger of said signals. The directional antennas $A_1$ and $A_2$ being differently oriented must, of course, respond differently to a given incoming signal. The receiving or amplifying circuits $M_1$ and $M_2$ are assumed to have the same gain. The switch $U_1$ is continuously operated at a rhythm suitable for rendering the gain control device of Fig. 2 effective. That is to say, there is a certain time constant to which the shunt combination of capacitor $C_2$ and resistor $R_2$ is adjusted. This time constant introduces a lag in the operation of the volume control device such that the latter responds to amplitude variations as brought about by the rhythmically operable switch $U_1$, but its effect is applied to the amplification of energy received after the switch has been thrown to its alternate position.

Suppose the signal to be entering from a direction toward which the antenna $A_1$ is oriented for maximum response. Antenna $A_2$ will then be oriented away from the direction of maximum response and while connected to the amplifier V through the receiver $M_1$ and switch $U_1$ will operate upon the feed-back circuit of Fig. 2 to discharge condenser $C_2$, thereby tending to equalize the potentials on the cathode and grid of the amplifier tube I. This action of the volume control device is immediately followed by the operation of switch $U_1$, so that the resultant gain increase is applied to the stronger signal coming in on antenna $A_1$. The stronger signal produces a desired response in the instrument $I_2$ (Fig. 5a) because the switch $U_2$ in the output circuit from the amplifier is operated synchronously with the switch $U_1$.

As will be readily understood from the foregoing, the effect of the stronger signal, part of which is rectified by the rectifier 8, will be to produce an increased voltage drop across the resistor $R_2$. This is not immediately effective upon the grid bias of the tube I, however, because it takes time to charge the condenser $C_2$. Just as condenser $C_2$ becomes charged so as to render the grid more negative, the switches $U_1$ and $U_2$ are changed back to accept the weaker signal collected by antenna $A_2$. Hence, the volume control device operates to decrease the gain in respect to the weaker signal as well as to increase the gain in respect to the stronger signal, each signal being first distinguished as to amplitude, by the orientation of the antenna by which it is collected.

The principal difference between the two embodiments shown in Fig. 5a and Fig. 5b is that in the first case the output from the amplifier V is switched alternately by the switch $U_2$ to the two indicators $I_1$ and $I_2$ in synchronism with the operation of switch $U_1$ on the input side of the amplifier V. In the second case, the same signal is utilized simultaneously both in the indicator I and in the phones T. The regulation must take place inside a length of time which is less than the duration of the briefest signal. The transient positive or negative potential peaks occurring in the amplifier output upon a change of signal, that is to say, upon an increase or decrease of the input amplitude are impressed upon a rather negatively biased amplifier and limiter tube II having a utilization circuit which may include any suitable indicator instrument.

The method here disclosed is not restricted in its use to amplifier arrangements of the kind hereinbefore indicated. In fact, any kind of outfit will be found useful which is adapted to indicate the sense of slight differences in the amplitude of two signals. Wherever in what follows amplifier devices are mentioned, this implies devices of any desired sort adapted to fulfill the purpose in question.

Figs. 3 to 6 illustrate the operation of the method here disclosed as well as arrangements adapted to carry the same into effect.

Fig. 3 shows the pattern of the radiation characteristic of a rotary beacon S and the receiving characteristics $A_1$ and $A_2$ of a receiver arrangement E which enclose an angle $\alpha$. The curves $a'$ $b'$ . . . and $a''$ $b''$ . . . . represent curves of equal signal strength. The equi-signal strength line of the two receiving characteristics is indicated by the dot-dash line L. Now, if both aerials $A_1$ and $A_2$ are connected each with an indicator instrument it will be evident that from the transmitter S by antenna $A_1$, in line with the incoming field intensity $d'$, more energy will be picked up than by the antenna $A_2$ characterized by incoming field intensity $d''$. Now, in order that this comparatively slight discrepancy may be increased, the dissimilarly strong signals are alternately supplied to an amplifier outfit with a single indicator. By the aid of such an outfit it is easy to emphasize and make more salient slight differences in the signal amplitude. As long as line L differs from the shortest connection: receiver-transmitter, the sense of such deviations is safely determinable, in fact, the precision amounts to fractions of angular degrees.

It is only when the transmitter whence bearings are taken is located upon the equi-signal strength line L (Fig. 4) that the two signals will be received with like intensity. In that case it would depend upon the circuit arrangement that is employed as to whether or not both signals will be amplified or whether they would be substantially suppressed.

Fig. 5a shows schematically the construction of an arrangement adapted to practice the method here disclosed. $A_1$ and $A_2$ are the two directional antennae, $A_1$ and $A_2$ presenting a suitable angle to each other; $M_1$ and $M_2$ are the input stages, and these may be amplifiers, rectifiers, modulator or heterodyne. By the aid of the change-over switch $U_1$ the outputs of the two directional antennae being modulated, for instance, at the receiving end with different tonal frequencies, are alternately connected with an amplifier outfit V, while by the aid of a second change-over switch $U_2$ the amplified signals may be fed to pointer instruments $I_1$ and $I_2$, or to another indicator.

Fig. 5b is a schematic view of a similar equipment. The two antennae $A_1$ and $A_2$ by the agency of a change-over switch U by way of an input stage M and an amplifier V are connected to a joint indicator instrument I or telephone T.

Fig. 6 shows an arrangement for adjustably mounting the directional antennae $A_1$ and $A_2$ so as to obtain both horizontal and vertical orientation thereof. The illustration shows also a combination arrangement whereby the radio receiver M and the change-over switch U are suitably mounted on the same adjustable support with the antenna. The directional antenna arrangement, the amplifier M, and switch U are rotatable about a vertical axis P, while being pivotally mounted on another axis D which is horizontally positioned, adjustment being effected by the aid of a hand-wheel H. The inclination of the arrangement in reference to the horizontal is read on a pointer $Z_1$ which moves over a suitable dial X. The angular deviation in a plane perpendicular to the axis P in reference to the north-south direction can be read by the aid of another pointer $Z_2$ over a circular scale Y.

Fig. 7 shows an embodiment which insures direction finding in two planes placed preferably at right angles to each other. Similarly as in Fig. 6, the antennae are combined into a ruggedly built element comprising the input stages and the switch or switches, this construction unit being secured on a horizontal shaft $W_1$. The said shaft is journaled in a bearing $G_1$ and is rotated by the agency of a hand-wheel H. The bearing $G_1$ is supported by a second bearing $G_2$ which is revoluble about another horizontal shaft $W_2$. This shaft $W_2$ is placed at right angles to shaft $W_1$. The assembly may be turned about a vertical shaft $W_3$.

By the aid of this arrangement or a similar disposition being also turnable in all directions, it is thus feasible to determine very accurate directions or bearings in various planes, preferably in two planes at right angles to each other, as may be required, for instance, for determining the exact position of pilot balloons or aircraft equipped with a transmitter or a re-radiator (reflector).

The idea underlying the present invention is not confined to the instances hereinbefore disclosed by reference to the annexed drawings. More particularly speaking, directional antenna arrangements in lieu of direction finding loops may be mounted, while preserving the mechanical construction of detail parts.

Similarly, the directional antenna may be of the loop type, particularly in combination with linear auxiliary antennae or dipoles with curved (concave) reflectors.

I claim:

1. Receiving apparatus for determining its position in reference to a radio beam transmitter, comprising two directional antennae disposed with their directive axes at a fixed angle to each other, means for so orienting said antennae as a unit as to comprehend within said fixed angle the line of propagation of a wave coming from said transmitter toward said receiving apparatus, an amplifier, a signal responsive indicator, means including a change-over switch for alternately connecting said amplifier and indicator to first one and then the other of said antennae at a predetermined switching rhythm, and means having a time constant suitably adjusted to said switching rhythm for causing the gain in said amplifier to be so controlled by said wave that the antenna which delivers the stronger signal substantially shuts off the response of said indicator to the weaker signal, when the latter is delivered by the other antenna.

2. In a direction finding receiver, two directional antennae, means for orienting said antennae while maintaining a fixed angular separation between their directional axes, an amplifier, switching means for alternately connecting each antenna to said amplifier, volume control means operable to momentarily increase the gain in said amplifier in response to the collection of a weak signal by one of said antennae during a time interval when it is connected to said amplifier, and means for delaying the effect of such gain increase in said amplifier until the other of said antennae collects a strong signal and applies the same through said switching means to said amplifier.

3. A directional radio receiving system comprising a pair of antennae having a fixed angular relation between their axes of maximum energy pick-up, an amplifier, periodically operable switching means for transferring energy to said amplifier from first one and then the other of said antennae, a volume control device responsive to variations of output energy amplitude from said amplifier, and means including a time delay circuit connected to said volume control device for regulating the gain in said amplifier in respect to the signal received on one antenna but in accordance with the amplitude of a preceding signal received on the other antenna.

4. In a directional radio receiving system, the combination of an amplifier, a volume control device operable to control the gain in said amplifier in response to the amplitude of output energy from said amplifier, a universally orientable array of antennas adapted to intercept energy from different directions, cyclically operable switching means for connecting each of said antennae alternately to said amplifier, and means including a delay circuit effective upon said volume control device in timed relation to the cyclic frequency of said switching means for causing the stronger of two signals received on one antenna to reduce the gain in said amplifier while it is connected to the antenna that is receptive of a weaker signal, and for causing the weaker signal to increase the gain in said amplifier while it is connected to the antenna that is receptive of the stronger signal.

HANS SCHARLAU.